(12) United States Patent
Tanaka et al.

(10) Patent No.: US 6,247,092 B1
(45) Date of Patent: Jun. 12, 2001

(54) CONTROL OF COMMAND TRANSMISSION AND RECEPTION IN A DATA TRANSMISSION DEVICE AND DATA TRANSMISSION DEVICE THEREFOR

(75) Inventors: Hiroshi Tanaka; Junko Sasaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/226,406

(22) Filed: Jan. 6, 1999

(30) Foreign Application Priority Data

Jan. 9, 1998 (JP) .................................................. 10-002751

(51) Int. Cl.⁷ .................................................. G06F 13/00
(52) U.S. Cl. ............................................. 710/260; 710/48
(58) Field of Search .......................... 710/31–35, 48–51, 710/61–74, 260–269; 370/276, 278, 282; 379/59–63; 340/825; 375/220–222

(56) References Cited

U.S. PATENT DOCUMENTS

| | | | |
|---|---|---|---|
| 4,751,510 | * 6/1988 | Michel et al. ................... | 340/825.07 |
| 4,761,646 | * 8/1988 | Choquet et al. ................. | 340/825.52 |
| 4,862,456 | * 8/1989 | Giorgio ........................... | 370/276 |
| 5,450,530 | * 9/1995 | Snyder et al. .................... | 375/220 |
| 5,612,991 | * 3/1997 | Nair et al. ........................ | 455/423 |
| 5,793,950 | * 8/1998 | Suzuki et al. .................... | 714/57 |
| 6,067,318 | * 5/2000 | Bailey et al. .................... | 375/222 |
| 6,151,653 | * 11/2000 | Lin et al. ......................... | 710/129 |

* cited by examiner

Primary Examiner—Christopher B. Shin
(74) Attorney, Agent, or Firm—Helfgott & Karas, PC.

(57) ABSTRACT

A data transmission system includes a first data terminal equipment, a first modem, a transmission line, a second modem and a second data terminal equipment connected in series. In order to send a control command to the second modem, the first modem interrupts a path of transmission data from the first data terminal equipment to the transmission line. Then, the first modem sends the control command to the second modem. When the second modem detects the control commands, it interrupts a path of receiving data from the transmission line to the second data terminal equipment to avoid a dead-lock of the data transmission system.

13 Claims, 10 Drawing Sheets

CONTROL OF COMMAND TRANSMISSION AND RECEPTION IN A DATA TRANSMISSION DEVICE AND DATA TRANSMISSION DEVICE THEREFOR

BACKGROUND OF THE INVENTION

1. Field of the Invention

The present invention relates to a control method for command transmission and reception in a data transmission device such as a modem, and a data transmission device capable of realizing the control method. In addition, the present invention relates to a data transmission system using the data transmission device.

2. Description of the Prior Art

In a local area network, which connects a data terminal equipment to another data terminal equipment through at least two data transmission devices such as modems, various tests for checking the operation of the network, such as loop tests, are frequently executed. To execute, for example, a loop test, a data transmission device in one side sends a control command for instructing the loop test to an opposite side data transmission device.

In a conventional data transmission device such as a modem, the following methods have been used to transmit a control command to an opposite side modem.

The first method uses a so-called secondary channel. In this method, the frequency band, through which signals are transmitted, is divided into at least two bands. One of the two bands is used to transmit data and the other is used to transmit control signals such as control commands.

The second method attaches address information to command data so as to specify an opposite side device to which the control command should be transmitted. In this case, the receiving side device extracts the address information from the received signals to determine whether the command data are sent to itself.

However, the above-mentioned methods have the following problems. In fact, the first method using the secondary channel makes the bandwidth of the data transmission channel narrower since the entire frequency band must be divided into two channels. In a conventional case where a transmission speed was relatively slow, no serious problem arose due to such a narrow bandwidth. In recent years, however, a higher data transmission speed has been required. In order to increase the data transmission speed, the entire width of a transmission band of a transmission line must be used only for data transmission. It is therefore difficult to divide the transmission band into a plurality of sub-bands.

On the other hand, a strong demand exists to reduce the manufacturing cost of the devices. As a result, a trend has arisen not to provide a function to send address information to the data transmission devices from an external equipment. If the data transmission devices do not have the function to receive address information, the second method mentioned above is difficult to realize. Moreover, the possibility of setting the wrong address remains a problem in the second method.

It may be possible to provide no address information to a command. In this case, no address should be set in the data transmission devices. However, this invites a serious problem, such as dead-lock of system, when a tandem connection is adopted between two data transmission devices such as modems.

SUMMARY OF THE INVENTION

The present invention has been made to overcome the above-mentioned problems of the prior arts.

Therefore, the object of the present invention is to provide a control method of command transmission/reception in a data transmission device, the method which is capable of transmitting and receiving control commands without causing a dead-lock and without attaching any address information to the data transmission device.

Another object of the present invention is to provide a data transmission device which is capable of realizing the control method and to provide a data transmission system using the data transmission devices.

In order to accomplish the above mentioned objects, the first feature of the present invention provides a control method for command transmission in a transmission device, the transmission device being connected to an end of a transmission line and sending a signal outputted from an information processing apparatus to the transmission line, the control method comprising the steps of interrupting a path of transmission data from the information processing apparatus to the transmission line, and sending a control command to the transmission line so as to transmit the control command to an opposite side device connected to an opposite end of the transmission line.

The second feature of the present invention provides a control method of command reception in a transmission device, the transmission device being connected to an end of a transmission line and sending a signal outputted from an information processing apparatus to the transmission line, the control method comprising the steps of detecting a control command which has been sent from an opposite side device connected to an opposite end of the transmission line, responding to the detection and interrupting a path of receiving data from the transmission line to the information processing apparatus.

In the control method of command reception, when receiving the control command, the transmission device recognizes received data as command data by receiving a predetermined amount of data contained in the received data, responding to this recognition and interrupting the path of receiving data from the transmission line to the information processing apparatus.

The third feature of the present invention provides a transmission device existing between an information processing apparatus and a transmission line for sending a signal outputted by the information processing apparatus to the transmission line, the transmission device comprising, a first control unit for controlling the operation of the transmission device, a first register in which a transmission interrupt is set, according to a command sending instruction, by the first control unit, a second register in which command data are written, by the first control unit, to send a command, and a second control unit for interrupting a path of transmission data, sent from the information processing apparatus to the transmission line, when the transmission interrupt is set in the first register and sending the command data written in the second register to the transmission line.

The fourth feature of the present invention provides a transmission device between an information processing apparatus and a transmission line for sending a signal received from the transmission line to the information processing apparatus, the data transmission device comprising, a first control unit for controlling the operation of the transmission device, a first register in which a signal received from the transmission line is written, a second register in which a receiving interrupt is set by the first control unit when a command is written in the first register, a third register in which predefined data corresponding to the command are written by the first control unit when the first register receives the command, and a second control unit for interrupting a path for receiving data sent from the transmission line to the information processing apparatus when the receiving interrupt is set in the second register and sending the predefined data written in the third register to the information processing apparatus.

The fifth feature of the present invention provides a data transmission system in which a transmission device and a receiving device are oppositely arranged with each other so as to send command data from the transmission device to the receiving device, the transmission device comprising, a first control unit for controlling the operation of the transmission device, a first register in which a transmission interrupt is set according to a command sending instruction by the first control unit, a second register in which command data are written by the first control unit to send a command, and a second control unit for interrupting a path for transmission data which is inputted to the transmission device and sent to the receiving device through the transmission device when the transmission interrupt is set to the first register and sending the command data written in the second register to the receiving device, and the receiving device comprising a third control unit for controlling operation of the receiving device, a third register in which a signal received from the transmission device is written, a fourth register in which a receiving interrupt is set by the third control unit when a command is written in the third register, a fifth register in which predetermined data corresponding to the command are written by the third control unit when receiving the command, and a fourth control unit for interrupting a path for receiving data, which have been received from the transmission device and will be outputted through the receiving device, when the receiving interrupt is set in the fourth register, and outputting the predetermined data written in the fifth register as the receiving data.

The sixth feature of the present invention provides a command control method in a data transmission system, the system comprising; a transmission side device for outputting transmission data received from a transmission side information processing apparatus connected thereto to a transmission line, and a receiving side device for outputting receiving data received from the transmission side device through the transmission line to a receiving side information processing apparatus connected thereto, the transmission side device and the receiving side device being arranged oppositely via the transmission line so as to send a control command from the transmission side device to the receiving side device, the command control method comprising the steps of, in the transmission side device, interrupting a path for transmission data, which are outputted from the transmission side information processing apparatus and sent to the transmission line, when sending a control command to the receiving side device, and sending the control command from the transmission side device to the transmission line, and in the receiving side device, interrupting a path of receiving data, which is sent from the transmission line to the receiving side information processing apparatus, when receiving the control command from the transmission side device, and sending predetermined data corresponding to the control command to the receiving side information processing apparatus.

According to the above mentioned features, the control command need not have address information. Moreover, in the receiving side device, a path to send receiving data to a terminal equipment is interrupted. A control command transferred from the transmission side device is not transferred further ahead as it is. Therefore, even if a data loop back is conducted in this receiving side device, the control command will not be sent back to the transmission side device as it is. The dead-lock or the like in a conventional tandem connection can therefore be prevented.

Similarly, in the transmission side device, a path to send out transmission data, which have been sent from a terminal equipment etc., is interrupted. When a transmission requirement of a control command is detected, the control command is sent out after the path to send out transmission data obtained from the terminal equipment has been interrupted. As a result, the control command can be sent within the same frequency band as that of the transmission data without using the secondary channel.

To obtain a high transmission speed, the whole line capacity must be used only for data transmission, and therefore, no room is left to send out a command for instructing a loop test. The present invention interrupts the path of transmission data, which have been sent from a terminal equipment toward a transmission line, and therefore, the present invention need not use a secondary channel etc. to send a control command. The interruption may be conducted at a timing of an external instruction for starting a loop test (using switches).

DESCRIPTION OF THE PREFERRED EMBODIMENTS

Before describing the embodiments of the present invention, the related art and the disadvantages therein will be described with reference to the related figures.

Figure 1A:
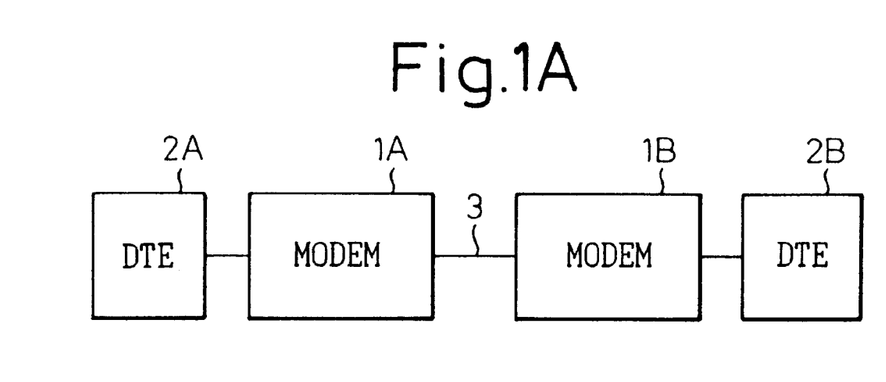
FIG. 1A is a view showing an example connection of data transmission devices such as modems.
Figure 1B:
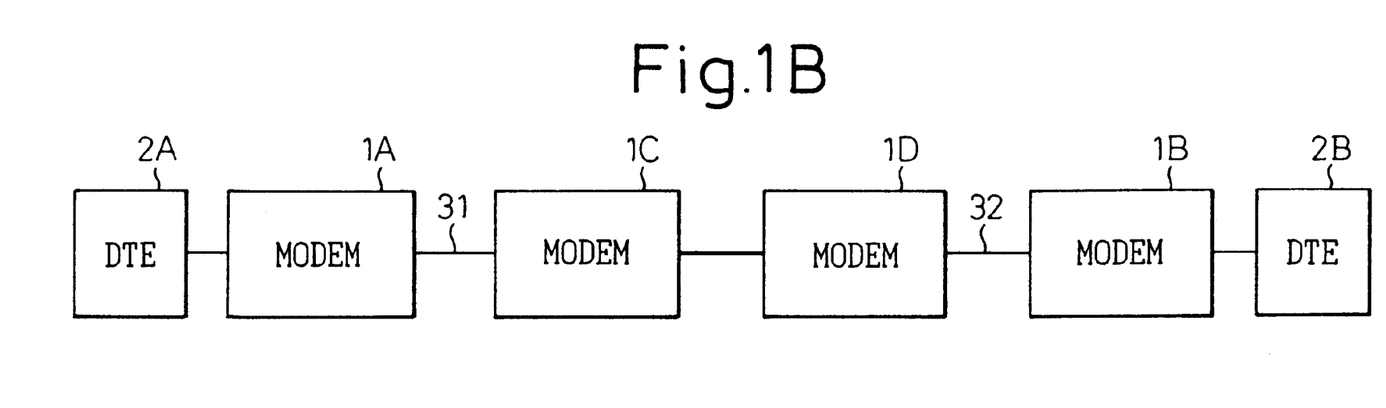
FIG. 1B is a view showing another example connection of data transmission devices such as modems.

FIGS. 1A and 1B are views showing examples of local area network for connecting between information processing apparatuses, which include computers and data terminal equipments, using data transmission devices such as modems and datasets. In particular, FIG. 1A shows a so-called point-to-point connection, in which a data transmission devices (referred to as modems, below) 1A and 1B are connected oppositely each other through a transmission line 3. In this case, modem 1A is connected to a data terminal equipment (referred to as a DTE, below) 2A while modem 1B is connected to a DTE 2B. The data transfer between DTE 2A and DTE 2B is carried out through modem 1A, the transmission line 3 and the modem 1B.

On the other hand, FIG. 1B shows an example of a tandem connection. In this case, modem 1A is connected with modem 1C through the data transmission line 31 while modem 1B is connected with modem 1D through the data transmission line 32. Modem 1C and modem 1D are connected oppositely with each other. The data transfer between DTEs 2A and 2B are carried out via modem 1A, line 31, modem 1C, modem 1D, line 32 and modem 1B. Such a tandem connection is utilized to extend, in this case, double, the length of the transmission line in the local area network.

In such a local area network, the conventional control method transmits control commands between modems using a secondary channel or by adding address information to the control commands. However, these transmission methods have disadvantages as mentioned before.

In order to avoid the above mentioned disadvantage, it is possible to attach no address information to the control command. In this case, no address information is required to be attached to the data transmission device. However, a problem arises especially in the system employing the tandem connection as described in FIG. 1B.

In the local area network as shown in FIG. 1B, the data transmission between DTEs 2A and 2B is carried out through intermediate modems 1C and 1D. In this network, a problem described below will arise if control commands do not have address information for specifying the individual devices in the network.

A loop test will be considered below to explain the problem. Although various kinds of loop test may be implemented to find defects in the network, a loop test carried out between modems 1A and 1C will be considered by way of example. In this case, modem 1A assumes to send a loop test command to modem 1C.

In a usual data transmission system using transmission lines, generation of bit errors cannot be avoided. For example, the bit error rate is in the order of $1 \times 10^{-7}$ which is considered as a value remediable by transmitting the same command again in the system. If a bit error occurs, no command is received by a modem. A plurality of blocks of a command are therefore sent to the transmission line to avoid such command transmission errors.

Figure 2:
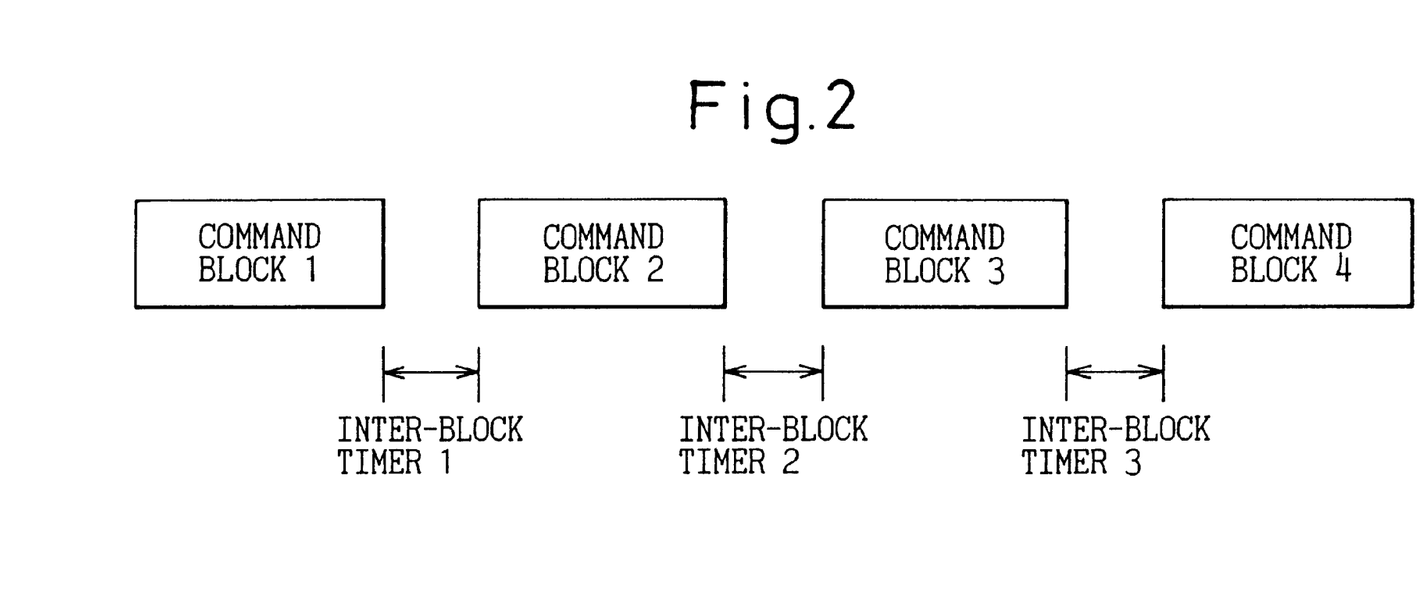
FIG. 2 is a view showing an example structure of a control command.

FIG. 2 shows an example structure of command blocks. In this case, one command is sent four times in sequence as command block 1, command block 2, command block 3 and command block 4 with inter-block timer 1, 2 and 3. A modem is structured to recognize the command when it receives one command block normally.

Figure 3:
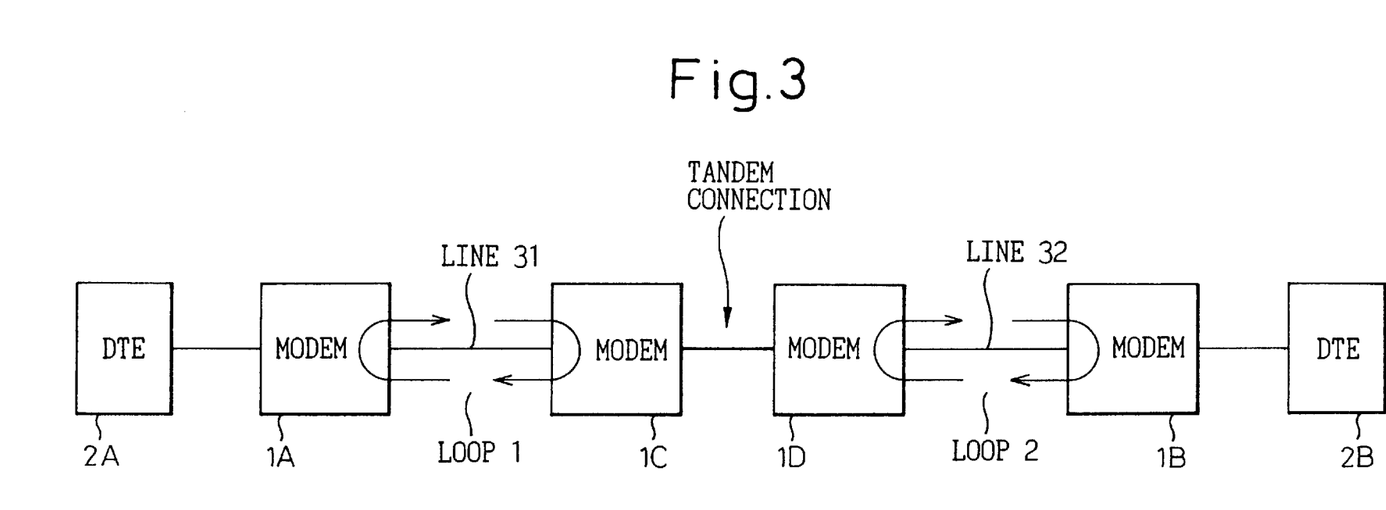
FIG. 3 is a view showing a dead-lock in a data transmission system.

Usually, reception of a command takes place by an interrupt operation. Therefore, even if the command block 1 is received normally by modem 1A, no loop may be formed between modem 1A and modem 1C during the inter-block timer 1 if the value of this timer 1 is extremely small. Whether a loop is formed during the inter-block timer 1 depends on the timing of the interruption. In the same manner, no loop may be formed during the inter-block timer 2. If a loop is formed during the inter-block timer 3, command block 4 is looped back to modem 1A from modem 1C to form loop 1 between modems 1A and 1C as shown in FIG. 3.

On the other hand, before loop 1 is formed, the normally received command blocks 1 to 3 are transmitted to modem 1B through modem 1D which is tandem-connected to modem 1C. As mentioned above, whether a loop is formed during an inter-block timer depends on the timing of an interruption. However, if a loop is formed right after modem 1B has received the command block 1, the command blocks 2 and 3 are looped back to modem 1D to form a loop 2. As a result, a dead-lock is formed as shown in FIG. 3.

As explained above, if address information is not attached to a control command, a dead-lock may possibly be formed in the data transmission system. In order to prevent the generation of a dead-lock, the first embodiment of the present invention provides a data transmission device (modem) 1 as shown in FIG. 4.

Figure 4:
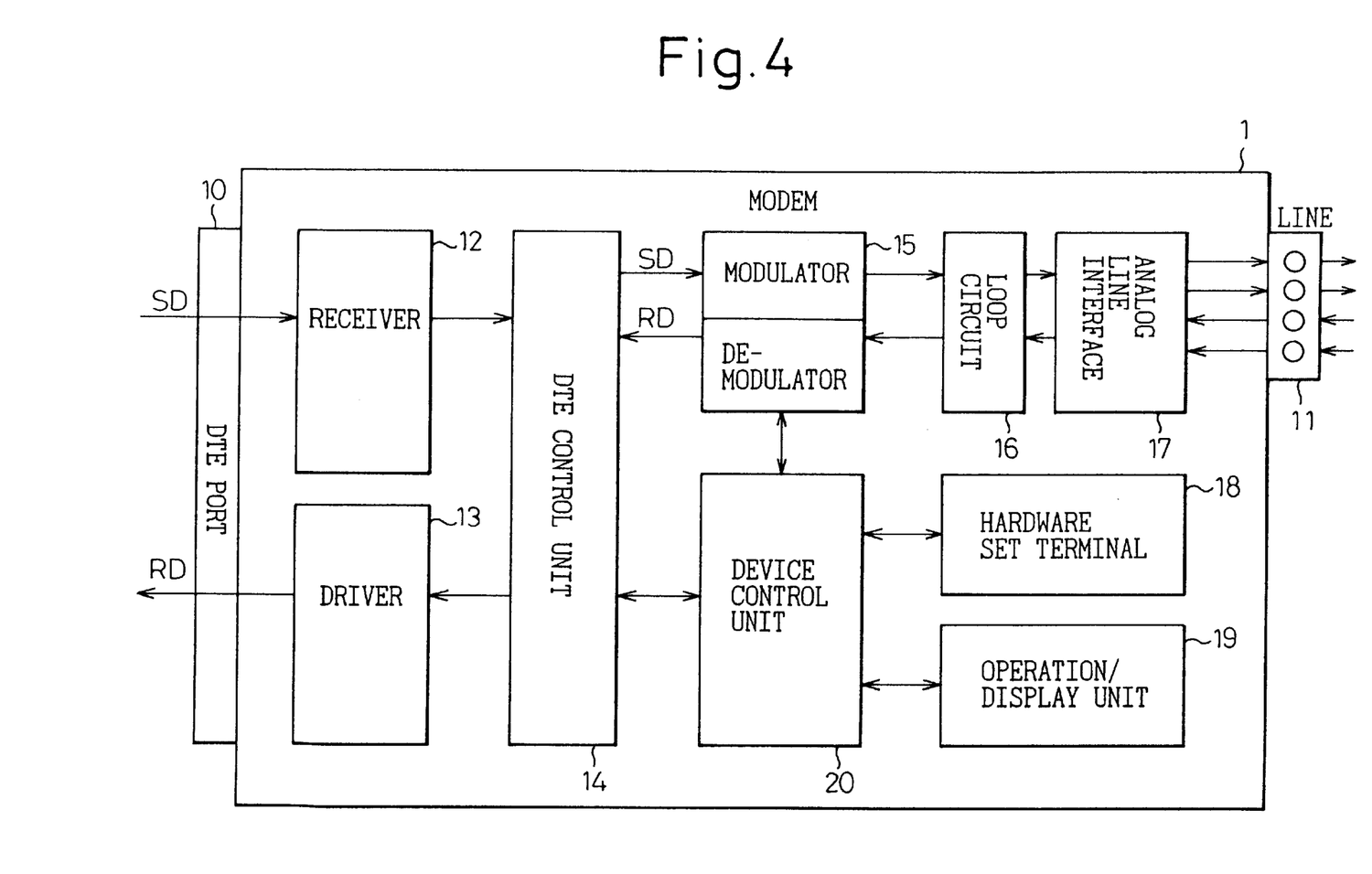
FIG. 4 is a view showing the structure of a data transmission device according to one embodiment of the present invention.

The modem 1 shown in FIG. 4 can be used as the modems 1A to 1D of the data transmission system shown in FIGS. 1A and 1B so as to construct a data transmission system according to one embodiment of the present invention. In case that the modem 1 is used as the modem 1A shown in FIG. 1B, the DTE port 10 is connected to DTE 2A while the line connecting terminal 11 is connected to modem 1C through the communication line 31. on the other hand, in case that the modem 1 is used as the modem 1C, the DTE port 10 is connected to the modem 1D while the line connecting terminal 11 is connected to modem 1A through the communication line 31.

As shown in FIG. 4, modem 1 includes a receiver 12 and a driver 13 for receiving and transmitting data from and to an opposite side device through DTE port 10. In fact, data SD inputted through DTE port 10 are received by the receiver 12 and sent to modem unit 15 through DTE control unit 14. The data SD modulated in modem unit 15 are outputted from the line connecting terminal 11 through a loop circuit 16 and an analog line interface 17. The loop circuit 16 is provided to conduct a loop test which is different from the loop test under consideration.

On the other hand, received data from the transmission line are supplied to modem unit 15 through the analog line interface 17 and the loop circuit 16, and demodulated in the modem unit 15. The demodulated data (RD) are then supplied to the driver 13 through DTE control unit 14, and outputted to the opposite device through DTE port 10.

As shown in the figure, a hardware set terminal 18 is provided in order to set various operational conditions for this modem 1. This terminal 18 is comprised of a DIP (dual inline package) switch etc. In addition, operation/display unit 19 is provided on an operation panel in order to display operational conditions of modem 1 and to set various operations manually for this modem 1. Device control unit 20 controls overall operations of the modem. The control of this modem is carried out by firmware.

Figure 5:
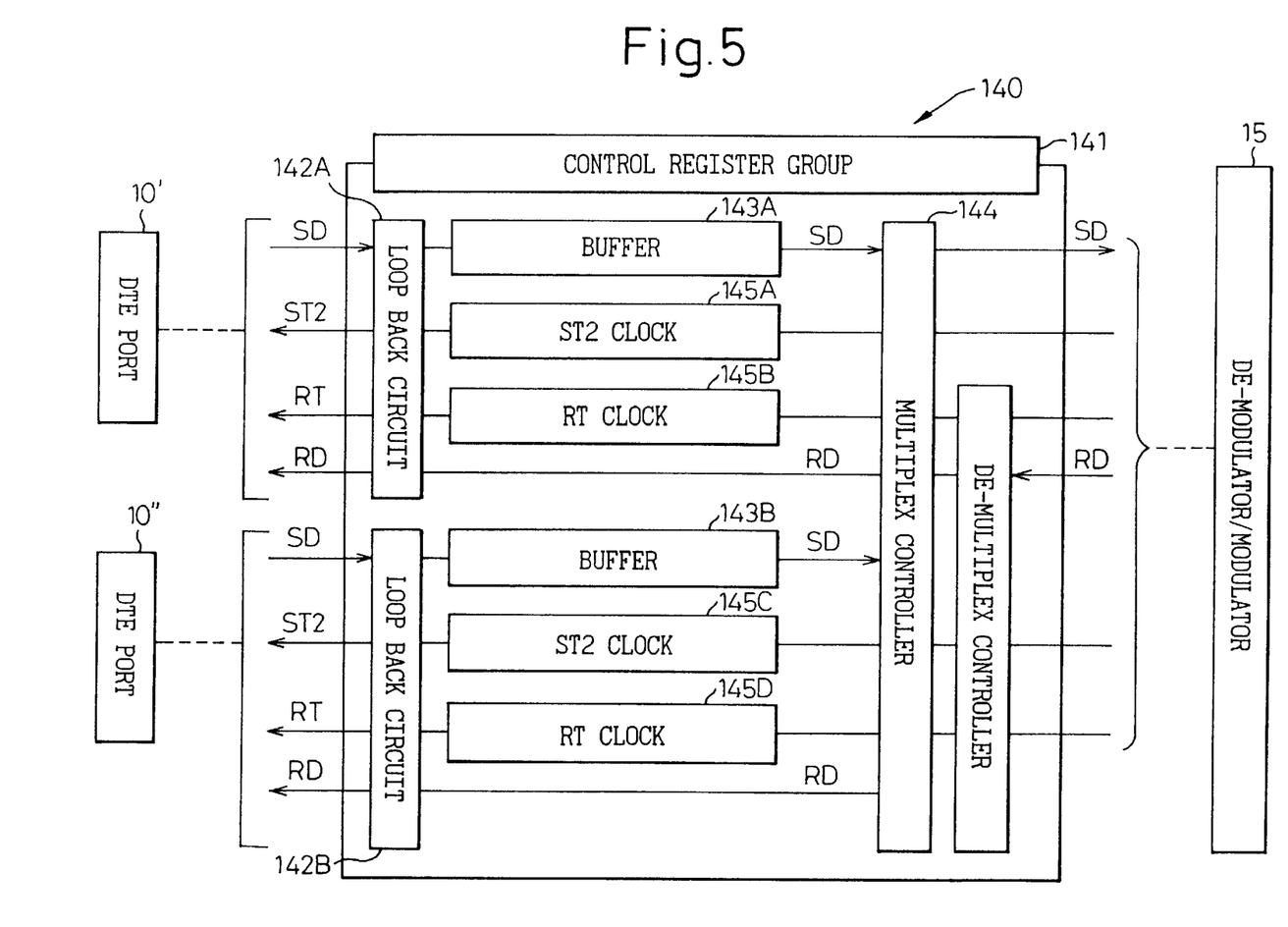
FIG. 5 is a functional block diagram showing the detailed structure of a DTE control unit shown in FIG. 4.

FIG. 5 shows an example of the internal structure of the DTE control unit 14 shown in FIG. 4. The DTE control unit 140 of this embodiment is designed to be used in a modem having two DTE ports 10' and 10", unlike the DTE control unit 14. Therefore, the DTE control unit 140 multiplexes the data from the DTE ports 10' and 10" and sends the multiplexed data toward the transmission line.

In FIG. 5, the control register group 141 works as an interface unit to introduce instructions from outside of the DTE control unit 140, for example, from the device control unit 20 as shown in FIG. 4, to the DTE control unit 140. In fact, the device control unit 20 writes various instructions in the control register group 141. According to one embodiment of the present invention, the control register group 141 includes a transmission data register, a transmission interrupt interface register, two receiving data registers and a receiving interrupt interface register. The detail of these registers will be explained later with reference to FIG. 6.

A loop back circuit 142A or 142B forms a loop for a loop test according to an instruction given from the outside of this unit 140. A buffer 143A or 143B buffers transmission data SD given from a DTE. Then, the buffer 143A or 143B gives the data SD to the multiplex controller 144 in synchronous with the clock (ST2) of the buffer.

ST2/RT clock generators 145A, 145B, 145C and 145D receive a master clock and modulation rate information from the modem unit 15 shown in FIG. 4. Then, the ST2/RT clock generators generate clocks (transmission timing ST2/ receiving timing RT) according to the received master clock and the modulation rate information and issue the clocks to the respective DTEs. In case that the modem has a plurality of DTE ports 10' and 10" as shown, the multiplex controller 144 multiplexes the data SD received from the respective DTEs. On the other hand, the demultiplex controller 147 demultiplexes the received data RD, which have been multiplexed, into a plurality of data groups having a data speed corresponding to the respective DTEs so as to supply the data to the respective DTES.

Now, the behaviour of the modem 1 will be explained with respect to a case in which one DTE is connected to the modem 1.

Figure 6:
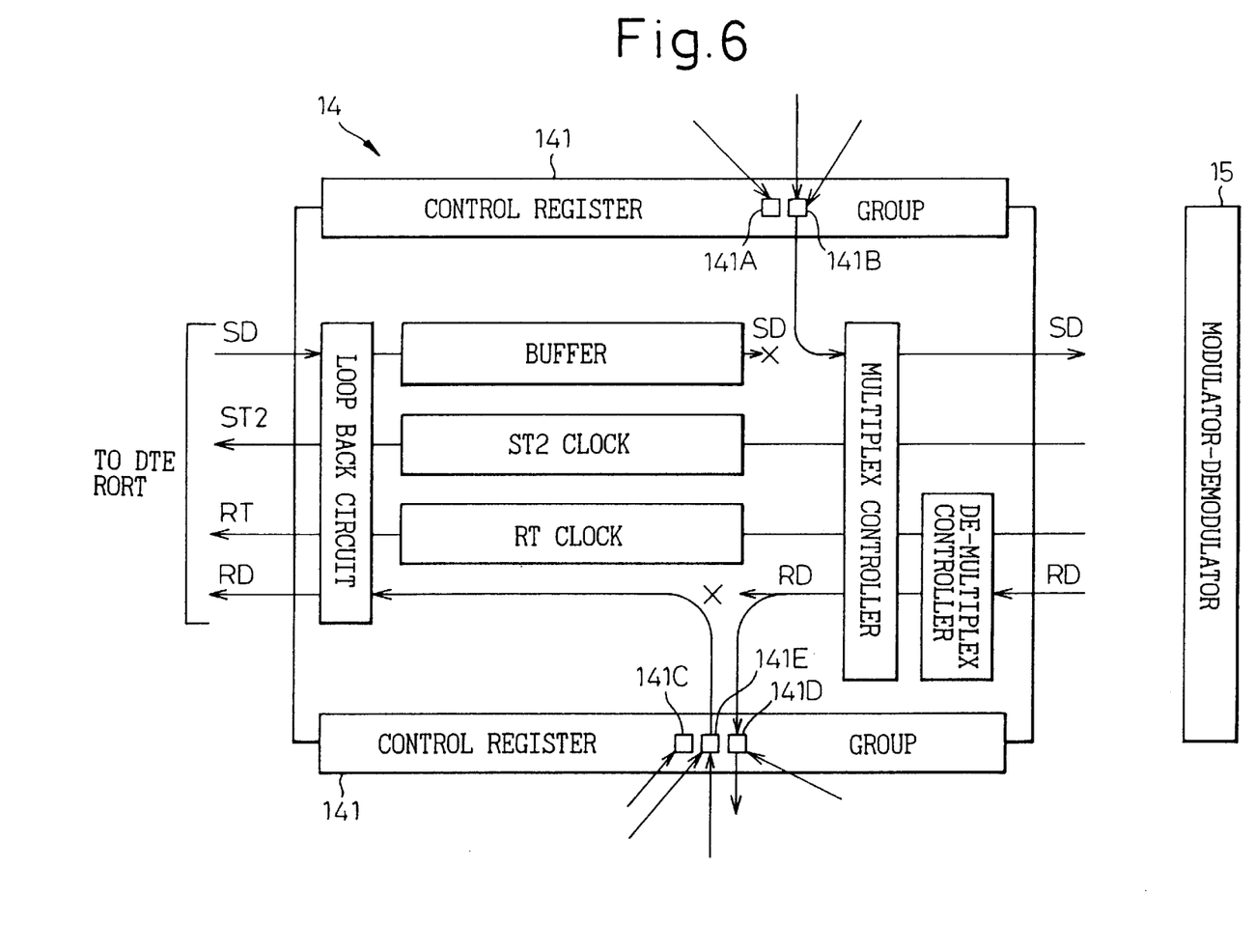
FIG. 6 is a view showing the structure of the DTE control unit along with a flow of signals/controls.

FIG. 6 is a diagram showing the flow of data/control signals in a DTE control unit according to one embodiment of the present invention. In this embodiment, the basic structure of the DTE control unit 14 is the same as that of shown in FIG. 5. However, since FIG. 6 shows an example of one DTE port 10, the loop back circuit for another DTE port and so on are not shown.

As shown in FIG. 6, the control register group 141 includes a transmission interrupt interface register 141A and a transmission data register 141B as transmission side control registers. In addition, the control register group 141 includes a receiving interrupt interface register 141C and two received data registers 141D and 141E as receiving side control registers. The details of these registers will be explained later.

In a case where the modem 1 sends a control command to an opposite side modem to execute a loop test, the DTE control unit 14 will operate as follows.

In the modem 1 at the command transmitting side, the device control unit 20 issues an instruction to send a control command. Then, the device control unit 20 sets a transmission interrupt in the transmission interrupt interface register 141A. Due to this setting of the transmission interrupt in the transmission interrupt interface register 141A, the DTE control unit 14 interrupts the signal path from the DTE (in the figure, shown as SD-X). In addition, the device control unit 20 writes a control command in the transmission data register 141B so that the command will be transmitted to the opposite side modem. Responding to this, the DTE control unit 14 sends the control command written in the transmission data register 141B to the modem unit 15 as the data SD through the multiplex controller 144. The data SD is then sent to the opposite side modem through the loop circuit 16, the analog line interface 17 and the transmission line as shown in FIG. 4.

On the other hand, the opposite side modem receives the data SD, sent by the transmission side modem 1 through the transmission line, and transmits the received data to the DTE port 10 as the data RD. Note that the modem 1 shown in FIG. 6 can be used as the receiving side modem as well as the transmission side modem. Therefore, the behaviour of the receiving side modem is explained using the modem 1 shown in FIG. 6.

When the data RD are inputted in the receiving side modem 1, they are transmitted to the DTE port 1 and, at the same time, written into the receiving data register 141D. The device control unit 20 can read the data RD by monitoring the receiving data register 141D. When the modem 1 receives a control command as the data RD sent from the transmission side modem, the control command is written into the receiving data register 141D. By monitoring the receiving data register 141D, the device control unit 20 recognizes whether the data RD is a control command. If the data RD is a control command, the device control unit 20 sets a receiving interrupt into the receiving interrupt interface register 141c and interrupts the path of the receiving data so that the receiving data RD from the transmission line cannot be supplied to the DTE (as shown by 'RD X' in FIG. 6). At the same time, dummy data are inputted to the receiving data register 141E. The DTE control unit 14 then supplies the dummy data written in the receiving data register 141D to the loop back circuit 142 as the data RD. When conducting a loop test, the data supplied to the loop back circuit 142 are looped back and outputted toward the transmission side modem through the transmission line after being modulated in the modem unit 15.

In this case, the data written in the receiving data register 141E do not comprise a control command. Accordingly, the control command, which has been transmitted from the transmission side modem to instruct the loop test, will not be looped back to the modem at the transmission side, thus no dead-lock is formed in the data transmission system using the modems. Also, any control command other than a loop test command will not be transmitted further beyond the multiplex controller 144. Accordingly, if a third modem is tandem-connected to the receiving side modem, the control command received from the transmission side modem will not be transferred to the third modem.

Figure 7:
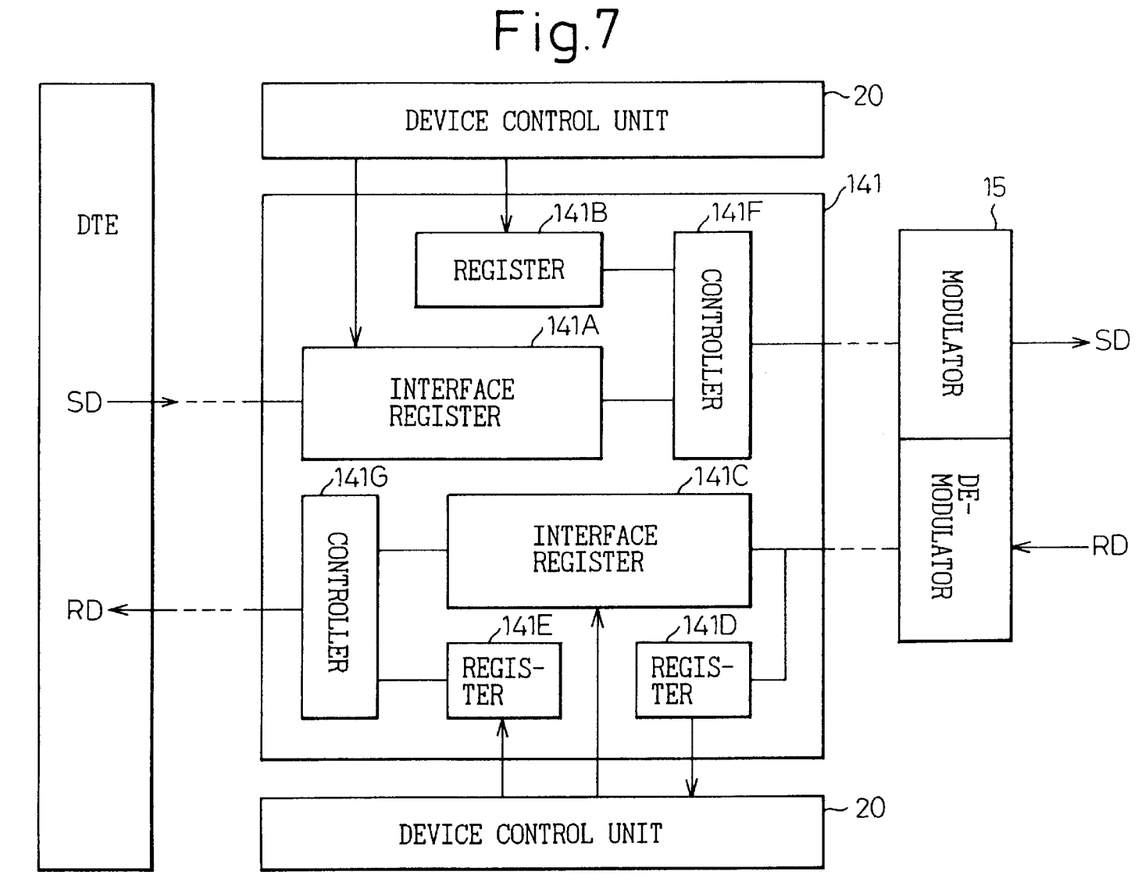
FIG. 7 is a block diagram showing the inside of the control register group shown in FIGS. 5 and 6.

FIG. 7 is a view for explaining how to set the transmission interrupt/receiving interrupt in the DTE control unit 14 according to one embodiment of the present invention. Note that FIG. 7 mainly illustrates the inside structure of the control register 141, and therefore, other structural elements such as the buffer etc. in unit 14 are not shown in this figure.

In a usual data transmission, the first controller 141F connects the transmission interrupt interface register 141A to the modem 15 so that the data SD from the DTE are transmitted to the modem 15 and outputted through the transmission line. When the device control unit 20 sets an interrupt in the transmission interrupt interface register 141A, the first controller 141F breaks the data path between the DTE port 10 and the modem unit 15. On the contrary, it connects the transmission data register 141B to the modem unit 15 through the transmission interrupt interface register 141A. The control command written in the transmission data register 141B is therefore transmitted to the transmission line as the data SD through the modem unit 15.

On the other hand, the second controller 141G connects the receiving interrupt interface register 141C to the DTE port 10 in a usual data reception. Accordingly, the data RD from the modem unit 15 are sent to the DTE port 10 through the receiving interrupt interface register 141C and the second controller 141G. When the device control unit 20 finds that a control command is introduced into the receiving interrupt interface register 141C by monitoring the first receiving data register 141D, the second controller 141G breaks the data path between the receiving interrupt interface register 141C and the DTE port 10, and connects the second receiving data register 141E to the DTE port 10. At the same time, the device control unit 20 writes dummy data corresponding to the control command in the second receiving data register 141E. Accordingly, the data stored in the second receiving data register 141E, that is, the dummy data, are transmitted to the outside DTE through the DTE port 10. The control command will not therefore be transmitted to the DTE port 10.

Figure 8:
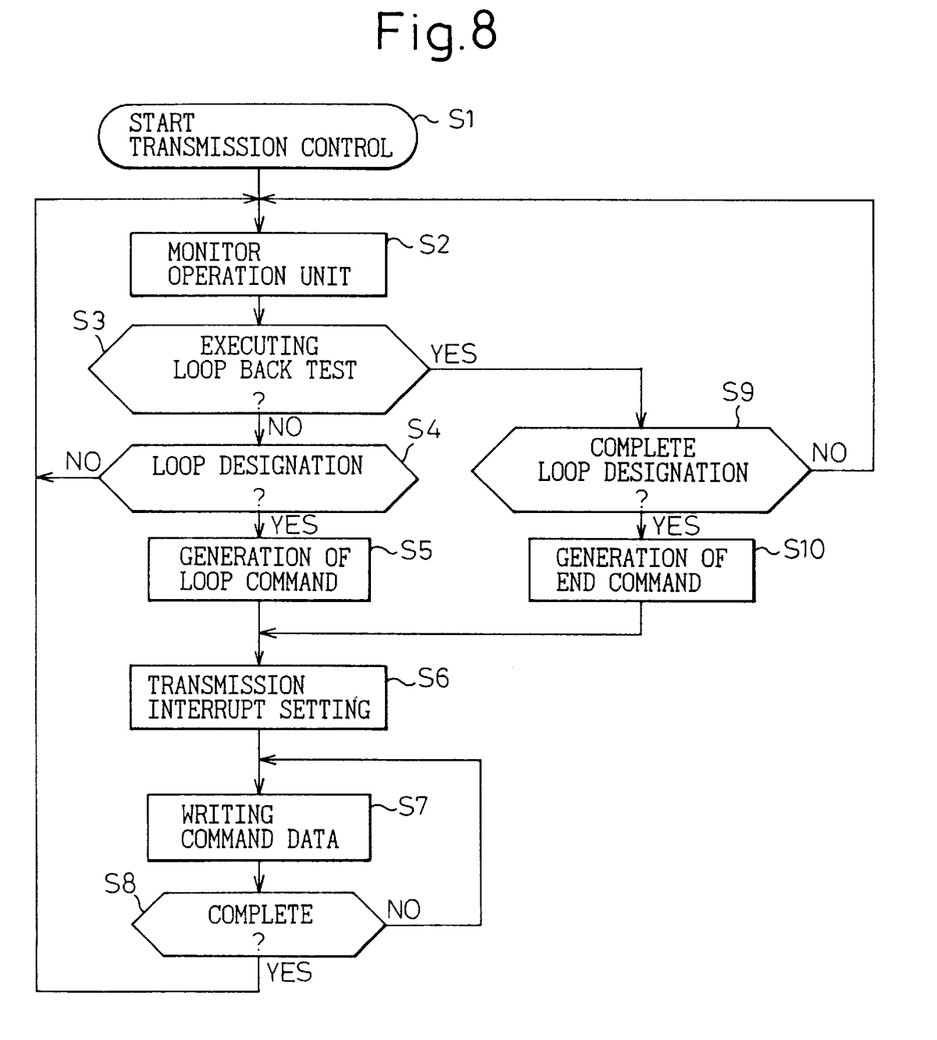
FIG. 8 is a flow chart showing the procedure of command sending control in a transmission side data transmission device.

FIG. 8 is a flowchart showing the operational procedure for executing a command transmission control at the transmission side modem. A loop test between modems is assumed to be conducted according to an operator input (step S1). At step S2, the device control unit 20 monitors the condition of the operation unit (operation/display unit 19), and finds at step S3 whether a loop test is under operation. In case of NO in step S3, the device control unit 20 finds if a loop formation is designated so as to form a loop with a modem to which the loop test should be conducted (at step S4). When the loop formation is designated, the device control unit 20 generates a loop back command to conduct the loop test (step S5). Then, the device control unit 20 sets a transmission interrupt to the transmission interrupt interface register 141A (step S6) and writes the control command to the transmission data register 141B (step S7). Having completed the writing of the control command into the transmission data register 141B (step S8), the procedure will be finished.

On the other hand, in case of YES at the step S3, the device control unit 20 finds whether the loop designation is completed. In case of YES at step S9, the device control unit 20 generates an END command (step S10) while it continues to monitor the operation unit in case of NO as shown in FIG. 8.

Figure 9:
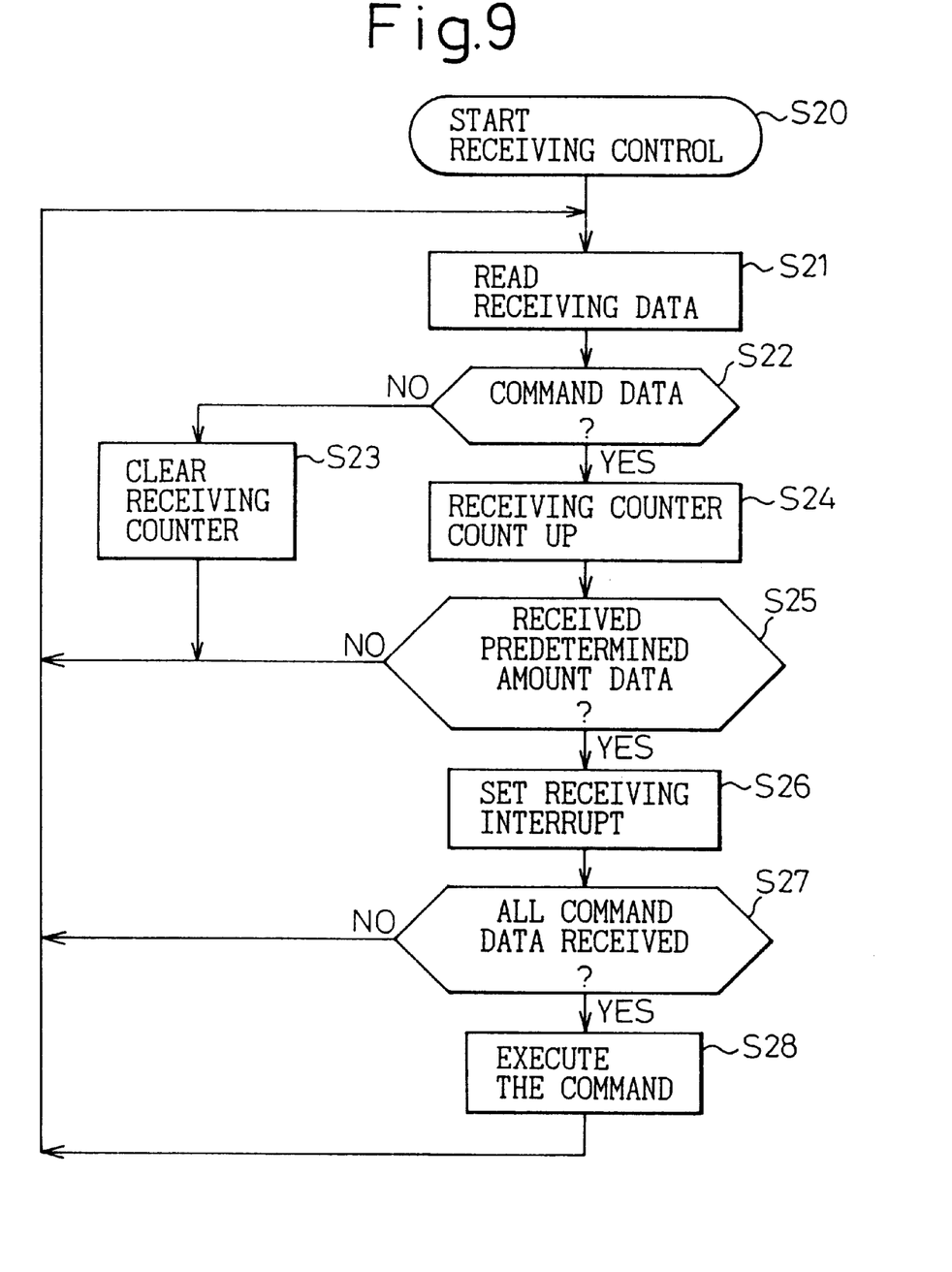
FIG. 9 is a flow chart showing the operational procedure of the command sending control in a receiving side data transmission device.

FIG. 9 is a flowchart for showing the operational procedure of the device control unit 20 at the data receiving side modem. After starting the receiving control (step S20), the device control unit 20 reads receiving data written in the receiving data register 141D (step S21) to find if the receiving data comprises a control command (step S22). In case that the receiving data do not comprise a control command, the device control unit 20 clears a counter value of a receiving counter in the device control unit 20 (step S23). On the other hand, when the receiving data comprises the control command, the device control unit 20 increments the receiving counter by one (step S24).

The receiving counter is provided in order to count the amount of data contained in the received control command. The modem according to one embodiment of the present invention is structured to recognize the receiving data as a control command if the modem receives a predetermined amount of data having a predetermined data format. Accordingly, the device control unit 20 finds whether the counter receives the predetermined amount of the data at step S25. In case that the predetermined amount of the data is received at step S25, the device control unit 20 recognizes the receiving data as a control command and sets a receiving interrupt to the receiving interrupt interface register 141C (step S26).

Figure 10:
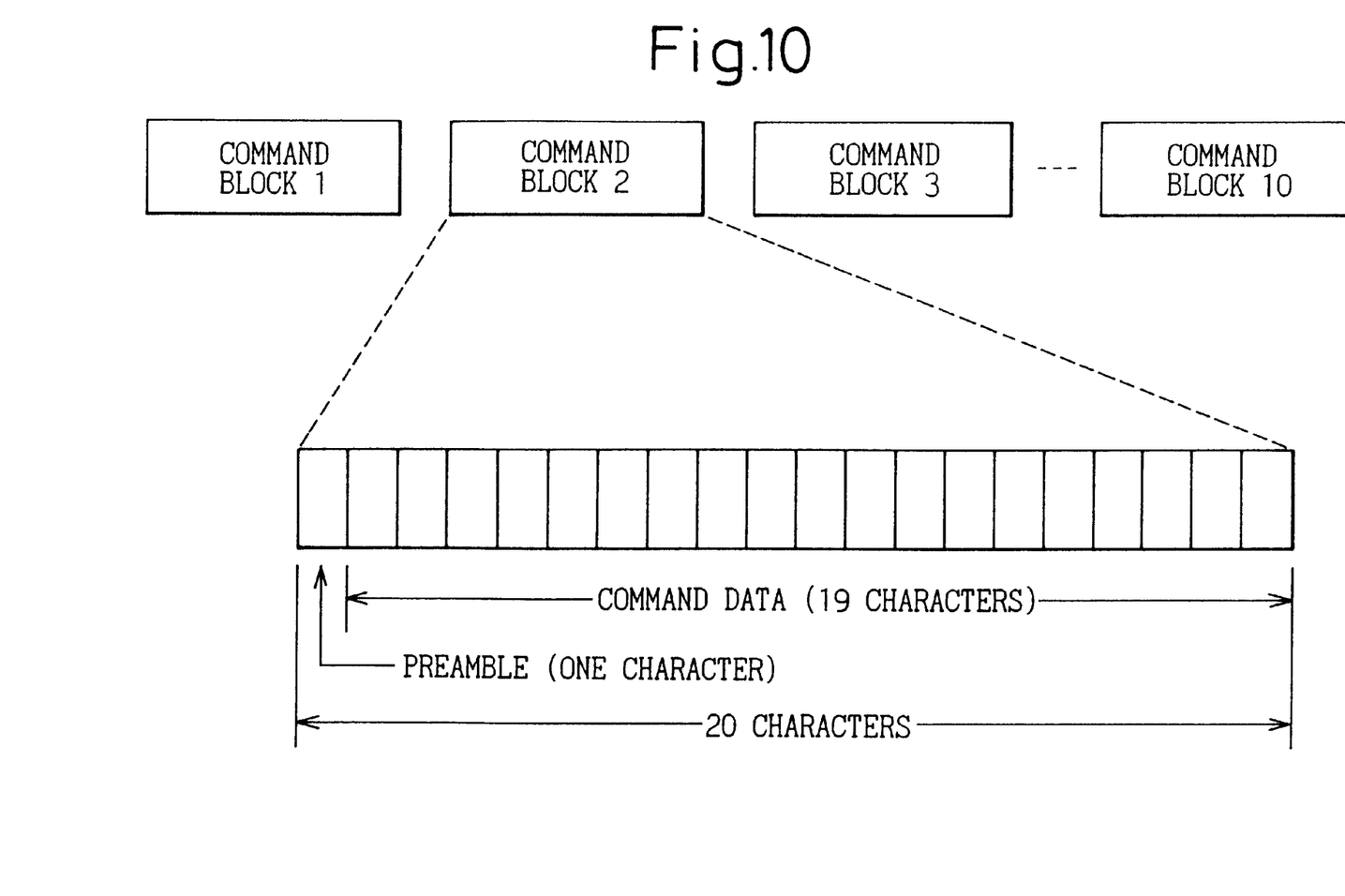
FIG. 10 is a view showing the structure of command blocks.

FIG. 10 shows an example of a data format according to one embodiment of the present invention. As shown in this figure, the present embodiment issues ten command blocks having the same content with each other. The data structure inside a command block is shown with respect to the command block 2. As shown, each command block is comprised of twenty characters. Each character is comprised of eight bit data having a start bit and a stop bit in front and at the back of the eight bit data respectively. Among the twenty characters, the head character is a preamble and the rests are command data.

In this embodiment, the device control unit 20 in the modem at the receiving side assumes that it receives a control command by receiving five of the ten command blocks. In addition, the device control unit 20 assumes that it receives one block by receiving fifteen characters out of the twenty characters. Further, the device control unit 20 assumes that it receives command data by receiving ten characters out of the twenty characters. Then, the device control unit 20 interrupts the transmission of the receiving data to the DTE side.

When the device control unit 20 receives all the command data (step S27 in FIG. 9), the device control unit 20 executes processes corresponding to the command (step S28). Thus, a control for a loop test is completed.

Eventually, the data written into the transmission data register or the second receiving data register are ones corresponding to the loop test.

As described above, the present invention enables to execute a control by a control command without using a secondary channel or without attaching a destination address to the data of the control command.

Especially, according to transmission or reception of the control command, the present invention interrupts a data path through which usual data are transmitted. Then, the present invention transmits the control command and the related data to an external device using another data path. The present invention can thus prevent the control command and the related data from being transferred to the external device, which should not receive the control command and the related data.

What is claimed is:

1. A command control method in a data transmission system, said system comprising; a transmission side device for outputting transmission data received from a transmission side information processing apparatus connected thereto to a transmission line, and a receiving side device for outputting receiving data received from said transmission side device through said transmission line to a receiving side information processing apparatus connected thereto, said transmission side device and said receiving side device being arranged oppositely via said transmission line so as to send a control command from said transmission side device to said receiving side device, said command control method comprising the steps of:

in said transmission side device, interrupting a path of transmission data, which are outputted from said transmission side information processing apparatus and sent to said transmission line, when sending a control command to said receiving side device, and sending said control command from said transmission side device to said transmission line; and in said receiving side device, interrupting a path of receiving data, which is sent from said transmission line to said receiving side information processing apparatus, when receiving said control command from said transmission side device, and sending predefined data corresponding to said control command to said receiving side information processing apparatus.

2. The control method according to claim 1, wherein said transmission side device and said receiving side device comprise a modem, and said transmission side information processing apparatus and said receiving side information processing apparatus comprise a data terminal equipment.

3. A data transmission system in which a transmission device and a receiving device are oppositely arranged with each other so as to send command data from said transmission device to said receiving device, said transmission device comprising:
   a first control unit for controlling operation of said transmission device;
   a first register in which a transmission interrupt is set according to a command sending instruction by said first control unit;
   a second register in which command data are written by said first control unit to send a command; and
   a second control unit for interrupting a path of transmission data which is inputted to said transmission device and sent to said receiving device through said transmission device when said transmission interrupt is set to said first register and sending said command data written in said second register to said receiving device; and
said receiving device comprising:
   a third control unit for controlling operation of said receiving device;
   a third register in which a signal received from said transmission device is written;
   a fourth register in which a receiving interrupt is set by said third control unit when a command is written in said third register;
   a fifth register in which predefined data corresponding to said command are written by said third control unit when receiving said command; and
   a fourth control unit for interrupting a path of receiving data, which have been received from said transmission device and will be outputted through said receiving device, when said receiving interrupt is set in said fourth register, and outputting said predefined data written in said fifth register as the receiving data.

4. The data transmission system according to claim 3, wherein said transmission device and said receiving device comprise a modem and said information processing apparatus comprises a data terminal equipment.

5. A transmission device existing between an information processing apparatus and a transmission line for sending a signal received from said transmission line to said information processing apparatus, the data transmission device comprising:
   a first control unit for controlling operation of said transmission device;
   a first register in which a signal received from said transmission line is written;
   a second register in which a receiving interrupt is set by said first control unit when a command is written in said first register;
   a third register in which predefined data corresponding to said command are written by said first control unit when said first register receives the command; and
   a second control unit for interrupting a path of receiving data sent from said transmission line to said information processing apparatus when said receiving interrupt is set in said second register and sending the predefined data written in said third register to said information processing apparatus.

6. The transmission device according to claim 5, wherein said transmission device comprises a modem and said information processing apparatus comprises a data terminal equipment.

7. A transmission device existing between an information processing apparatus and a transmission line for sending a signal outputted by said information processing apparatus to said transmission line, the transmission device comprising:
   a first control unit for controlling operation of said transmission device;
   a first register in which a transmission interrupt is set according to a command sending instruction by said first control unit;
   a second register in which command data are written by said first control unit to send a command; and
   a second control unit for interrupting a path of transmission data sent from said information processing apparatus to said transmission line when said transmission interrupt is set in said first register and sending said command data written in said second register to said transmission line.

8. The transmission device according to claim 7, wherein said transmission device comprises a modem and said information processing apparatus comprises a data terminal equipment.

9. A control method for command reception in a transmission device, said transmission device being connected to an end of a transmission line and sending a signal outputted from an information processing apparatus to said transmission line, said control method comprising the steps of:
   detecting a control command which has been sent from an opposite side device connected to an opposite end of said transmission line; and
   responding to said detection, interrupting a path of receiving data from said transmission line to said information processing apparatus.

10. A control method according to claim 9, wherein, when receiving said control command, said transmission device recognizes receiving data as command data by receiving a predetermined amount of data contained in said receiving data and, in responding to this recognition, interrupts said path of receiving data from said transmission line to said information processing apparatus.

11. The control method according to claim 9, wherein said transmission device comprises a modem and said information processing apparatus comprises a data terminal equipment.

12. A control method for command transmission in a transmission device, said transmission device being connected to an end of a transmission line and sending a signal outputted from an information processing apparatus to said transmission line, said control method comprising the steps of:
   interrupting a path of transmission data from said information processing apparatus to said transmission line; and
   sending a control command to said transmission line so as to transmit the control command to an opposite side device connected to an opposite end of said transmission line.

13. The control method according to claim 12, wherein said transmission device comprises a modem and said information processing apparatus comprises a data terminal equipment.

* * * * *